(12) United States Patent
Tsuchida et al.

(10) Patent No.: US 7,538,515 B2
(45) Date of Patent: May 26, 2009

(54) MOTOR CONTROLLER (75) Inventors: Masahiro Tsuchida, Okazaki (JP);
Daisuke Mizuno, Kariya (JP)

(73) Assignee: Denso Corporation, Kariya (JP)

( * ) Notice: Subject to any disclaimer, the term of this patent is extended or adjusted under 35 U.S.C. 154(b) by 32 days.

(21) Appl. No.: 11/902,215

(22) Filed: Sep. 20, 2007

(65) Prior Publication Data
US 2008/0088264 A1   Apr. 17, 2008

(30) Foreign Application Priority Data
Oct. 12, 2006  (JP)  ............................ 2006-278703
May 15, 2007  (JP)  ............................ 2007-129292

(51) Int. Cl.
*H02P 23/00* (2006.01)
(52) U.S. Cl. ...................... 318/811; 318/599
(58) Field of Classification Search ........................ None
See application file for complete search history.

(56) References Cited

U.S. PATENT DOCUMENTS

| 4,626,763 | A | * | 12/1986 | Edwards ....................... 318/811 |
| 5,277,093 | A | | 1/1994 | Kinta |
| 5,407,143 | A | | 4/1995 | Nakai et al. |
| 6,271,641 | B1 | * | 8/2001 | Yasohara et al. ............ 318/685 |
| 6,929,476 | B2 | | 8/2005 | Katsuda et al. |
| 2005/0042572 | A1 | | 2/2005 | Katsuda et al. |

FOREIGN PATENT DOCUMENTS

| JP | U-H5-2597 | 1/1993 |
| JP | A-07-000849 | 1/1995 |
| JP | A-07-130040 | 5/1995 |
| JP | A-07-314226 | 12/1995 |
| JP | A-08-090883 | 4/1996 |
| JP | A-10-028485 | 2/1998 |
| JP | A-11-161358 | 6/1999 |
| JP | A-11-302965 | 11/1999 |
| JP | A-2000-97056 | 4/2000 |
| JP | A-2002-154073 | 5/2002 |
| JP | A-2003-164180 | 6/2003 |
| JP | A-2004-088940 | 3/2004 |
| JP | A-2004-180399 | 6/2004 |
| JP | A-2006-280091 | 10/2006 |
| JP | A-2006-346524 | 12/2006 |

* cited by examiner

*Primary Examiner*—Bentsu Ro
*Assistant Examiner*—Renata McCloud
(74) *Attorney, Agent, or Firm*—Posz Law Group, PLC (57) ABSTRACT

A motor controller includes an inverter circuit, a speed detector, an amplifier, a voltage detector, and an offset voltage addition circuit. The inverter circuit drives a motor based on a PWM signal. The speed detector generates an actual speed signal corresponding to an actual speed of the motor. The amplifier outputs a differential voltage by amplifying a difference between the actual speed signal and a target speed signal. The voltage detector outputs a switch signal for switching rotation direction of the motor. The switch signal has a first level, when the differential voltage is equal to or greater than a predetermined value. The switch signal has a second level, when the differential voltage is less than the predetermined value. The offset voltage addition circuit adds an offset voltage to the differential voltage according to the signal level of the switch signal.

2 Claims, 7 Drawing Sheets

MOTOR CONTROLLER

CROSS CHECK TO RELATED APPLICATION

This application is based on and incorporates herein by reference Japanese Patent Applications No. 2006-278703 filed on Oct. 12, 2006 and No. 2007-129292 filed on May 15, 2007.

FIELD OF THE INVENTION

The present invention relates to a motor controller.

BACKGROUND OF THE INVENTION

Figure 6:
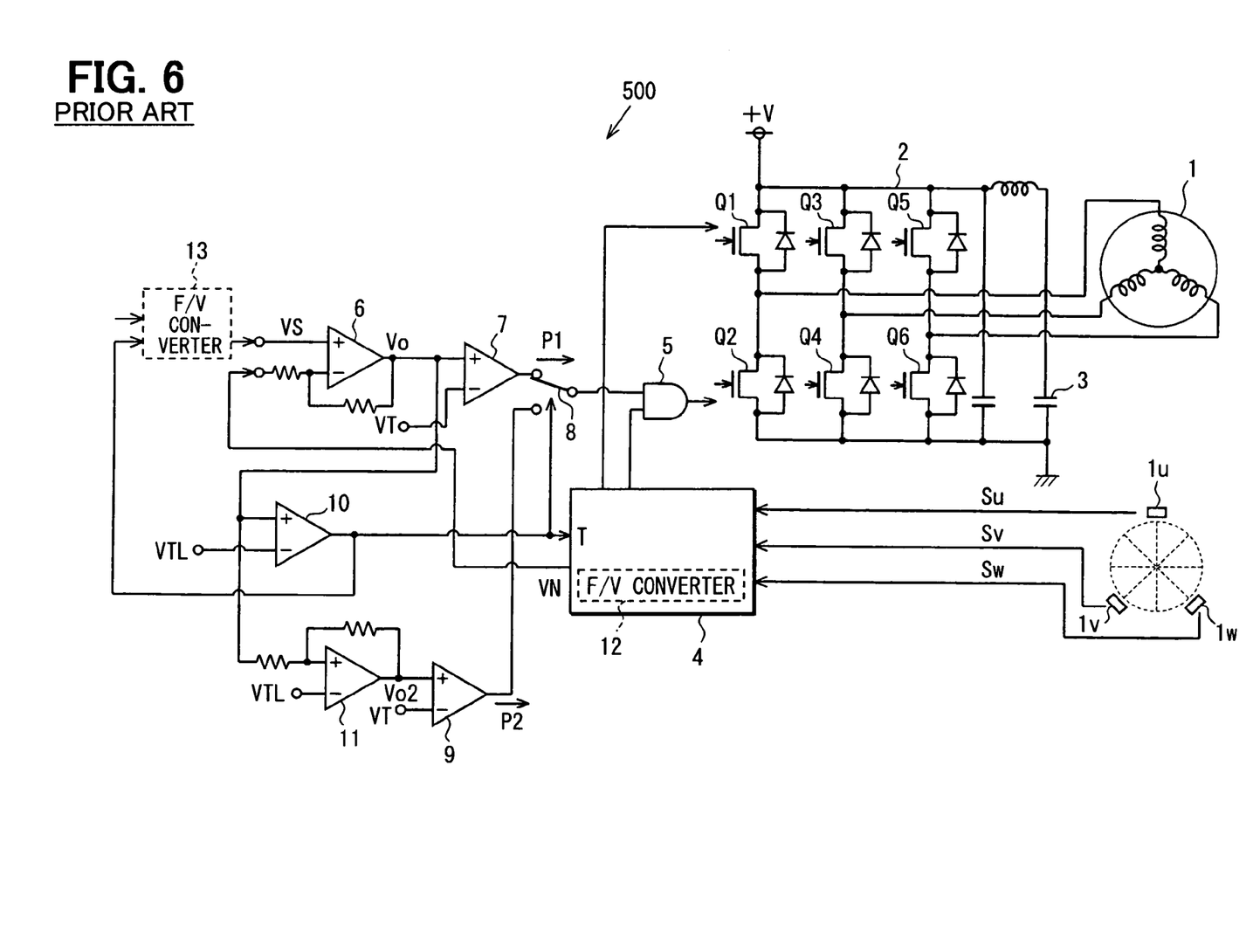
FIG. 6 is a block diagram of a conventional motor controller.

Typically, a motor controller consists of an inverter circuit. FIG. 6 shows an example of this type of motor controller. A conventional motor controller 500 shown in FIG. 6 is partially disclosed in JP-A-2006-280091. The conventional motor controller 500 is configured to control a three-phase brushless direct current (DC) motor 1. For example, the motor 1 is used as a power source for a device that governs valve cam timing of an engine of a vehicle.

A three-phase inverter circuit 2 for driving the motor 1 includes six N-channel power metal oxide semiconductor field-effect transistors (MOSFETs) Q1-Q6. The MOSFETs Q1-Q6 are connected in a three-phase bridge configuration between a power supply terminal +V and a ground terminal. The MOSFETs Q1, Q3, Q5 form an upper side arm of the inverter circuit 2. The MOSFETs Q2, Q4, Q6 form a lower side arm of the inverter circuit 2. The MOSFETs Q1, Q2 are connected to each other at a node connected to an U-phase coil of the motor 1. The MOSFETs Q3, Q4 are connected to each other at a node connected to a V-phase coil of the motor 1. The MOSFETs Q5, Q6 are connected to each other at a node connected to a W-phase coil of the motor 1. As can been seen from FIG. 6, each of the MOSFETs Q1-Q6 is provided with a flywheel diode. A pi-type LC filter circuit 3 is connected between the power supply terminal +V and the ground terminal.

Three Hall effective integrated circuits (ICs) $1u$, $1v$, $1w$ detect a rotation position (rotor position) of the motor 1 and output position detection signals Su, Sv, Sw, respectively, to a control circuit 4. The position detection signals Su, Sv, Sw are phase-shifted to each other by 120 degrees. The control circuit 4 detects a rotation direction of the motor 1 based on the position detection signals Su, Sv, Sw and outputs a rotation speed signal VN having a voltage level proportional to an actual rotation speed of the motor 1. The control circuit 4 has a frequency to voltage (F/V) converter 12 that converts a rotation frequency corresponding to the actual rotation speed of the motor 1 into the rotation speed signal VN. The F/V converter 12 is not disclosed in the drawings of JP-A-2006-280091.

The control circuit 4 outputs gate control signals to the inverter circuit 2 based on the rotation direction of the motor 1 and input timings of the position detection signals Su, Sv, Sw. The gate control signals are applied to gate terminals of the MOSFETs Q1-Q6, respectively. When the gate control signals are set to a first pattern, the motor 1 is driven to rotate in forward direction. In contrast, when the gate control signals are set to a second pattern, the motor 1 is driven to rotate in reverse direction. The gate control signals are directly applied to the gates of the MOSFETs Q1, Q3, Q5, respectively. In contrast, the gate control signals are applied to the gates of the MOSFETs Q2, Q4, Q6 through an AND gate 5, respectively. Although FIG. 6 illustrates one AND gate 5, the MOSFETs Q2, Q4, Q6 are individually provided with the AND gate 5.

The control circuit 4 has a rotational direction switch terminal T for receiving a rotation direction switch signal from a third comparison circuit 10. When the switch signal is at a low level, the gate control signals are set to the first pattern so that the motor 1 is driven to rotate in forward direction. In contrast, when the switch signal is at a high level, the gate control signals are set to the second pattern so that the motor 1 is driven to rotate in reverse direction.

An amplifier circuit 6 has a non-inverting input terminal for receiving a target voltage signal VS from a F/V converter 13 and an inverting input terminal for receiving the rotation speed signal VN from the control circuit 4. The F/V converter 13 converts a frequency signal, which is fed from an electronic control unit (ECU) of the vehicle, into the target voltage signal VS. The F/V converter 13 is not disclosed in the drawings of JP-A-2006-280091. The target voltage signal VS has a voltage level proportional to a target rotation speed of the motor 1. The amplifier circuit 6 generates a differential voltage signal Vo by amplifying a difference between the target voltage signal VS and the rotation speed signal VN by a predetermined gain G. The differential voltage signal Vo is given by: $Vo=VS+G(VS-VN)$.

A first comparison circuit (i.e., comparator) 7 has a non-inverting input terminal for receiving the differential voltage signal Vo from the amplifier circuit 6 and an inverting input terminal for receiving a triangular wave signal VT from an oscillator circuit (not shown). For example, the triangular wave signal VT has amplitude of between 2.5 volts and 4 volts. The first comparison circuit 7 generates a first pulse-width modulation (PWM) signal P1 by comparing the differential voltage signal Vo with the triangular wave signal VT. The first PWM signal P1 is outputted to a signal switch circuit 8.

The signal switch circuit 8 switches between a forward rotation position and a reverse rotation position in accordance with a signal level of the switch signal outputted from the third comparison circuit 10. When the signal switch circuit 8 is in the forward rotation position, the first PWM signal P1 outputted from the first comparison circuit 7 is fed to a first input terminal of the AND gate 5. In contrast, when the signal switch circuit 8 is in the reverse rotation position, a second PWM signal P2 outputted from a second comparison circuit 9 is fed to the first input terminal of the AND gate 5. The gate control signals applied to the MOSFETs Q2, Q4, Q6 of the inverter circuit 2 are fed to a second input terminal of the AND gate 5.

The third comparison circuit 10 has hysteresis. The third comparison circuit 10 has an inverting input terminal for receiving the differential voltage signal Vo from the amplifier circuit 6 and a non-inverting input terminal for receiving a lower limit voltage VTL (i.e., 2.5 volts) of the triangular wave signal VT from a voltage signal generation circuit (not shown) such as a peak hold circuit. The third comparison circuit 10 generates the switch signal by comparing the differential voltage signal Vo with the lower limit voltage VTL. The switch signal is outputted to each of the control circuit 4 and the signal switch circuit 8. The signal level of the switch signal depends on the result of the comparison. Specifically, when the voltage level of the differential voltage signal Vo is equal to or greater than the lower limit voltage VTL (i.e., $Vo \geq VTL$), the switch signal becomes the low level. In contrast, when the voltage level of the differential voltage signal Vo is less than the lower limit voltage VTL (i.e., $Vo<VTL$), the switch signal becomes the high level. In practice, the hysteresis of the third comparison circuit 10 affects the signal level of the switch signal.

As described above, the signal switch circuit 8 switches between the forward rotation position and the reverse rotation position in accordance with the signal level of the switch signal. The signal switch circuit 8 switches to the forward rotation position, when the switch signal is at the low level, i.e., when the voltage level of the differential voltage signal Vo is equal to or greater than the lower limit voltage VTL (i.e., Vo≧VTL). In contrast, the signal switch circuit 8 switches to the reverse rotation position, when the switch signal is at the high level, i.e., when the voltage level of the differential voltage signal Vo is less than the lower limit voltage VTL (i.e., Vo<VTL).

An amplifier circuit 11 with a gain of 1 has a non-inverting input terminal for receiving the differential voltage signal Vo from the amplifier circuit 6 and an inverting input terminal for receiving the lower limit voltage VTL. The amplifier circuit 11 outputs a correction voltage signal Vo2 by inverting the differential voltage signal Vo with respect to the lower limit voltage VTL. Specifically, the correction voltage signal Vo2 is given by subtracting the differential voltage signal Vo from 5 volts (i.e., Vo2=5−Vo).

The second comparison circuit 9 has a non-inverting input terminal for receiving the correction voltage signal Vo2 from the amplifier circuit 11 and an inverting input terminal for receiving the triangular wave signal VT. The second comparison circuit 9 generates the second PWM signal P2 by comparing the correction voltage signal Vo2 with the triangular wave signal VT. The second PWM signal P2 is outputted to the signal switch circuit 8.

According to the conventional motor controller 500, when the differential voltage signal Vo is equal to or greater than 2.5 volts (i.e., lower limit voltage VTL of the triangular wave signal VT), the signal switch circuit 8 switches to the forward rotation position. Thus, the first PWM signal P1 is fed from the first comparison circuit 7 to the AND gate 5 through the signal switch circuit 8.

In this case, the correction voltage signal Vo2 becomes less than 2.5 volts, because Vo2=5−Vo. Therefore, whereas the first PWM signal P1 has enable pulse width, a duty ratio of the second PWM signal P2 is 0 percent. Further, since the switch signal outputted form the third comparison circuit 10 is at the low level, the control circuit 4 sets the gate control signals to the first pattern. Thus, the motor 1 is feedback-controlled and driven to rotate in forward direction at the target rotation speed corresponding to the target voltage signal VS.

Then, if the target voltage signal VS sharply decreases, the difference between the target voltage signal VS and the rotation speed signal VN transiently increases. As a result, the differential voltage signal Vo is temporally reduced to less than 2.5 volts so that the switch signal outputted from the third comparison circuit 10 becomes the high level. Therefore, the signal switch circuit 8 switches to the reverse rotation position, and the second PWM signal P2 is fed from the second comparison circuit 9 to the AND gate 5 through the signal switch circuit 8.

In this case, the correction voltage signal Vo2 exceeds 2.5 volts, because Vo2=5−Vo. Therefore, whereas a duty ratio of the first PWM signal P1 becomes 0 percent, the second PWM signal P2 has enable pulse width. Further, since the switch signal outputted from the third comparison circuit 10 is at the high level, the control circuit 4 sets the gate control signals to the second pattern. Thus, reverse toque (braking torque) is applied to the motor 1 so that the speed of the motor 1 sharply decreases.

Then, when the difference between the actual rotation speed of the motor 1 and the target rotation speed of the motor 1 is reduced below a predetermined value, the differential voltage signal Vo exceeds the lower limit voltage VTL of the triangular wave signal VT again. As a result, the switch signal outputted from the third comparison circuit 10 becomes the low level. Therefore, the signal switch circuit 8 switches to the forward rotation position so that the first PWM signal P1 having the enable pulse width is fed to the AND gate 5. Thus, the motor 1 returns to a normal condition and is controlled based on the first PWM signal P1.

Figure 7A:
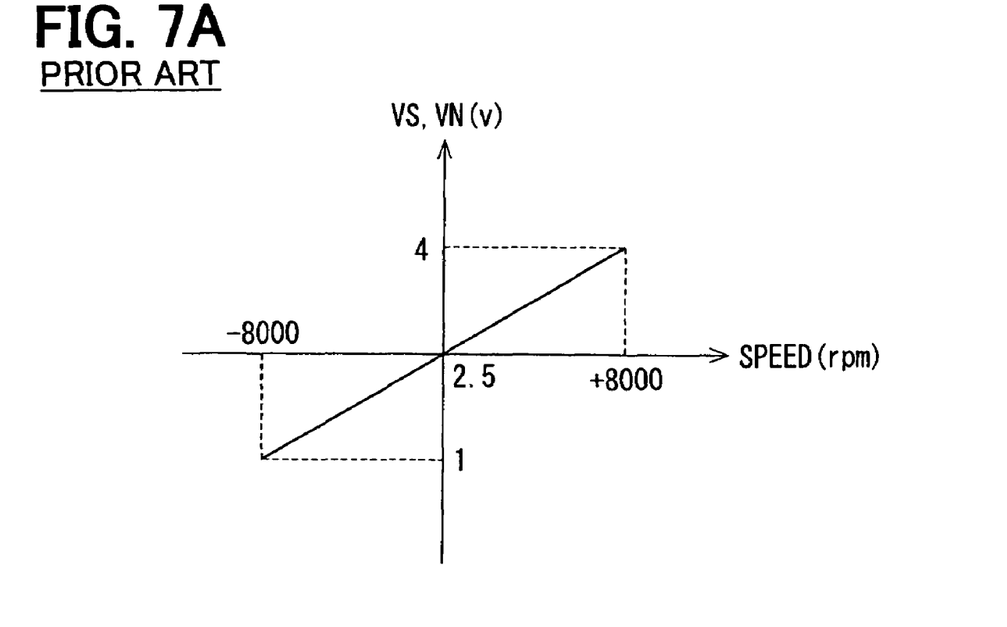
FIG. 7A is a graph showing an ideal relationship among an actual rotation speed of a motor controlled by a conventional motor controller, a target voltage signal, and a rotation speed signal in the conventional motor controller.

As a result, relationships among the actual rotation speed of the motor 1, the target voltage signal VS, and the rotation speed signal VN may become as shown in FIG. 7A, which is disclosed in JP-A-2006-280091. As can be seen from FIG. 7A, when the target voltage signal VS is in a first range between 2.5 volts and 4.0 volts, the motor 1 is driven to rotate in forward direction. In contrast, when the target voltage signal VS is in a second range between 1.0 volts and 2.5 volts, the motor 1 is driven to rotate in reverse direction.

Figure 7B:
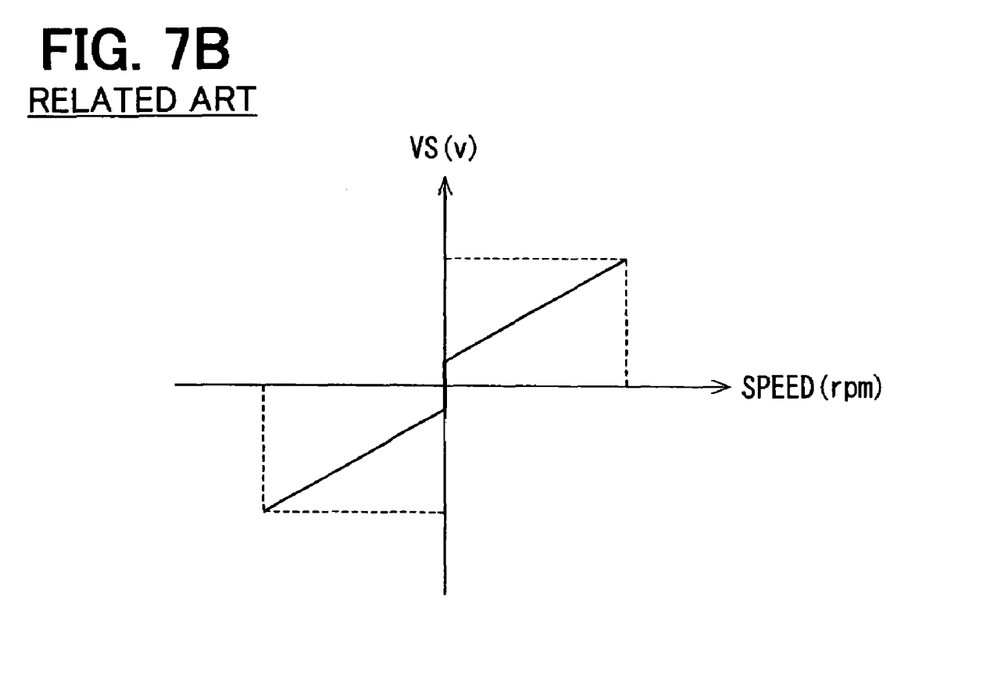
FIG. 7B is a graph showing an actual relationship between the actual rotation speed of the motor and the target voltage signal in the conventional motor controller.

However, FIG. 7A shows ideal relationships among the actual rotation speed of the motor 1, the target voltage signal VS, and the rotation speed signal VN. In practice, as shown in FIG. 7B, an offset voltage is added to the target voltage signal VS to reverse the rotation direction of the motor 1. If the offset voltage is not added to the target voltage signal VS, torque required to drive the motor 1 that is in a stopped state cannot be produced. The addition of the offset voltage to the target voltage signal VS is performed in the F/V converter 13 at a timing when the signal level of the switch signal changes.

The difference between the target voltage signal VS and the rotation speed signal VN temporally increases, when the rotation direction of the motor 1 is reversed. Further since the offset voltage is added to the target voltage signal VS, the difference increases by the offset voltage. Furthermore, the difference is amplified by the amplifier circuit 6 so that the differential voltage signal Vo outputted from the amplifier circuit 6 becomes larger. Accordingly, the duty ratio of the first and second PWM signals P1, P2 significantly increases. As a result, an electric current flowing through the motor 1 increases, and MOSFETs Q1-Q6 may be overheated. Therefore, excessive current occurs in the inverter circuit 2, and the MOSFETs Q1-Q6 may be thermally broken.

SUMMARY OF THE INVENTION

In view of the above-described problem, it is an object of the present invention to provide a motor controller that reverses a rotation direction of a motor without an excessive current in an inverter circuit.

The motor controller includes an inverter circuit, a control circuit, a rotation speed detection circuit, an amplifier circuit, a first comparison circuit, a voltage detection circuit, a signal generation circuit, a second comparison circuit, a switch circuit, and an offset voltage addition circuit.

The inverter circuit drives the motor based on a PWM signal. The PWM signal includes a first PWM signal and a second PWM signal. The control circuit determines timing of supply of the PWM signal to the inverter circuit. The rotation speed detection circuit generates a rotation speed signal having a first voltage corresponding to an actual rotation speed of the motor. The amplifier circuit outputs a differential voltage signal by amplifying a difference between the rotation speed signal and a target rotation speed signal having a second voltage that causes the motor to rotate at a target rotation speed.

The first comparison circuit generates the first PWM signal by comparing the differential voltage signal with a carrier signal having a predetermined frequency. The carrier signal changes between an upper limit voltage and a lower limit voltage. The voltage detection circuit outputs a switch signal for reversing a rotation direction of the motor. The switch signal has a first signal level, when a voltage of the differential voltage signal is equal to or greater than the lower limit voltage of the carrier signal. The switch signal has a second signal level, when the voltage of the differential voltage signal is less than the lower limit voltage of the carrier signal. The signal generation circuit outputs a correction voltage signal during a period of time when the voltage of the differential voltage signal is less than the lower limit voltage of the carrier signal. The correction voltage signal has a voltage greater than the lower limit voltage of the carrier signal.

The second comparison circuit generates the second PWM signal by comparing the correction voltage signal with the carrier signal. The switch circuit supplies the first PWM signal to the control circuit, when the switch signal has the first signal level. The switch circuit supplies the second PWM signal to the control circuit, when the switch signal has the second signal level. The offset voltage addition circuit adds an offset voltage to the differential voltage signal according to the signal level of the switch signal. When the switch signal has the second signal level, the control circuit controls the inverter circuit in such a manner that the motor receives reverse torque.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1:
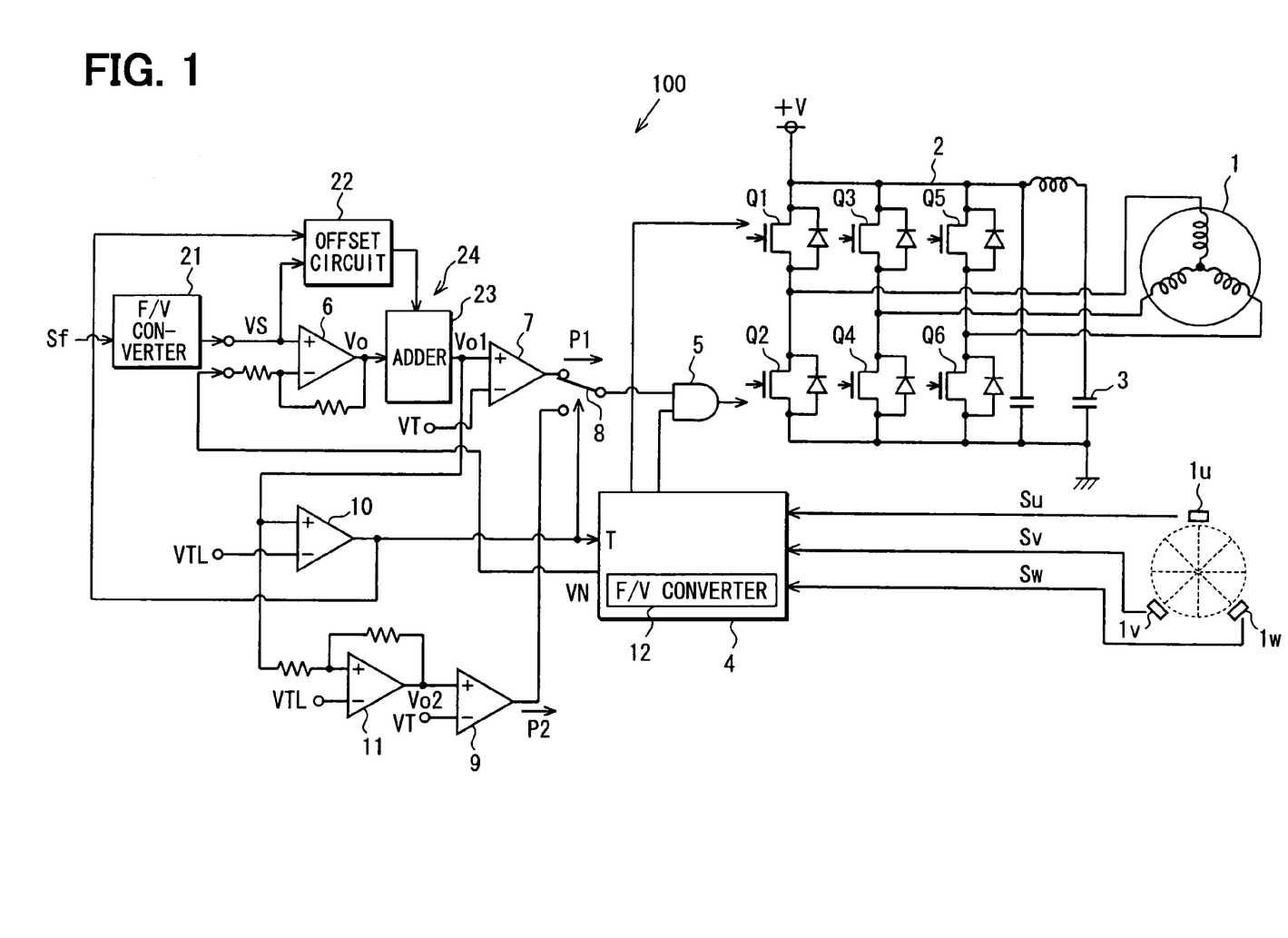
FIG. 1 is a block diagram of a motor controller according to a first embodiment of the present invention.
Figure 2A:
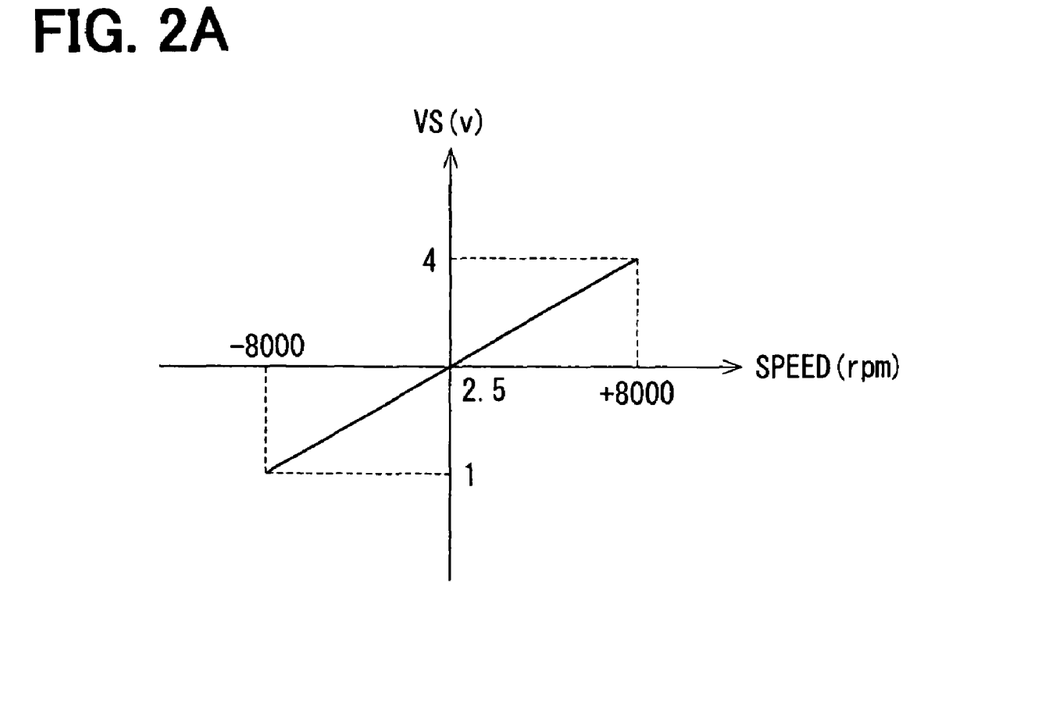
FIG. 2A is a graph showing an actual relationship between an actual rotation speed of a motor controlled by the motor controller of FIG. 1 and a target voltage signal in the motor controller of FIG. 1.

A motor controller 100 according to a first embodiment of the present invention is described below with reference to FIGS. 1-2B. Differences between the motor controller 100 shown in FIG. 1 and the conventional motor controller 500 shown in FIG. 6 are as follows:

The motor controller 100 includes a frequency to voltage (F/V) converter 21 replacing the F/V converter 13. The F/V converter 21 converts a frequency signal Sf, which acts as a command to control the motor 1, into a target voltage signal VS. The frequency signal Sf is fed from an electronic control unit (ECU) of the vehicle to the F/V converter 21. Unlike the F/V converter 13, the F/V converter 21 does not add an offset voltage to the target voltage signal VS. Therefore, the target voltage signal VS outputted from the F/V converter 21 changes linearly as shown in FIG. 2A.

The motor controller 100 has an offset circuit 22. The offset circuit 22 monitors a switch signal outputted from a third comparison circuit 10 and generates an offset voltage having a voltage level varying with a signal level of the switch signal. Specifically, when the switch signal is at a low level, the offset voltage is set to plus 1.0 volts. In contrast, when the switch signal is at a high level, the offset voltage is set to minus 1.0 volts.

The motor controller 100 further has an adder circuit 23. The adder circuit 23 is interposed between an amplifier circuit 6 and a first comparison circuit 7. The adder circuit 23 receives a differential voltage signal Vo from the amplifier circuit 6 and the offset voltage from the offset circuit 22. The adder circuit 23 generates an addition voltage signal Vo1 by adding the offset voltage to the differential voltage signal Vo. The adder circuit 23 outputs the addition voltage signal Vo1 to each of a first comparison circuit 7 and the third comparison circuit 10. The offset circuit 22 and the adder circuit 23 form an offset voltage addition circuit 24.

According to the motor controller 100, the F/V converter 21 outputs the target voltage signal VS of between 1.0 volts and 4.0 volts linearly. When the target voltage signal VS is in a first range between 2.5 volts and 4.0 volts, a motor 1 is driven to rotate in forward direction. In contrast, when the target voltage signal VS is in a second range between 1.0 volts and 2.5 volts, the motor 1 is driven to rotate in reverse direction.

When the target voltage signal VS is in the first range, the switch signal becomes the low level so that the offset circuit 22 outputs the offset voltage of plus 1.0 volts. In contrast, when the target voltage signal VS is in the second range, the switch signal becomes the high level so that the offset circuit 22 outputs the offset voltage of minus 1.0 volts. The adder circuit 23 adds the offset voltage to the differential voltage signal Vo to generate the addition voltage signal Vo1.

Figure 2B:
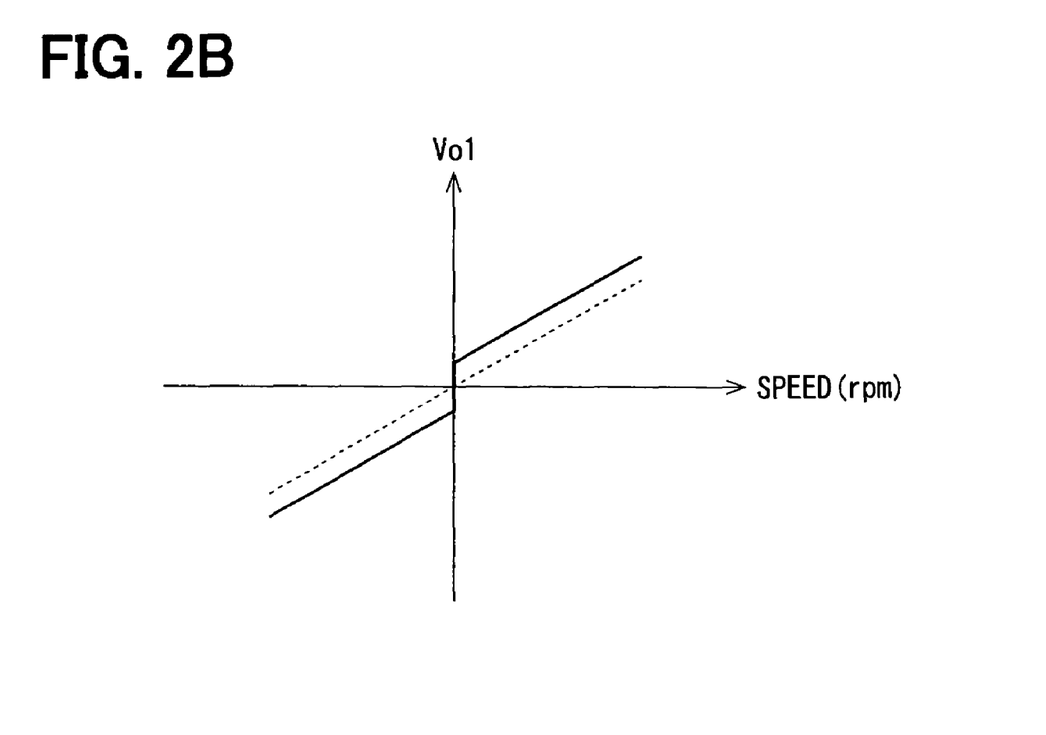
FIG. 2B is a graph showing a relationship between the actual rotation speed of the motor and an addition voltage signal in the motor controller of FIG. 1.

Because of the offset voltage, the addition voltage signal Vo1 changes as shown in FIG. 2B. Even when the differential voltage signal Vo decreases due to the fact that a target rotation speed of the motor 1 is set close to zero, the first PWM signal P1 (or second PWM signal P2) having a duty ratio corresponding to the offset voltage is fed to the inverter circuit 2. Thus, the motor 1 can be surely driven to rotate in forward (or reverse) direction.

In summary, when the target voltage signal VS changes across the boundary (i.e., 2.5 volts) between the first and second ranges, the switch signal changes between the low and high levels accordingly. The offset circuit 22 adds the offset voltage to the differential voltage signal Vo so that torque of the motor 1 can be increased to a level required to drive the motor 1 that is in a stopped state. Thus, the motor controller 100 can surely control the motor 1, even when the rotation direction of the motor 1 is reversed.

Unlike the conventional motor controller 500 shown in FIG. 6, the offset voltage is not added to the target voltage signal VS, which is inputted to the amplifier circuit 6. Therefore, as shown in FIG. 2A, the target voltage signal VS changes lineally. The offset voltage is added to the differential voltage signal Vo, which is outputted from the amplifier circuit 6. In such an approach, even when the target voltage signal VS sharply changes, the duty ratio of the first PWM signal P1 (or second PWM signal P2) can be kept at a desired value, as compared to the conventional motor controller 500. Therefore, excessive current in the inverter circuit 2 can be reduced so that thermal breakdown of the MOSFETs Q1-Q6 can be prevented.

Second Embodiment

Figure 3:
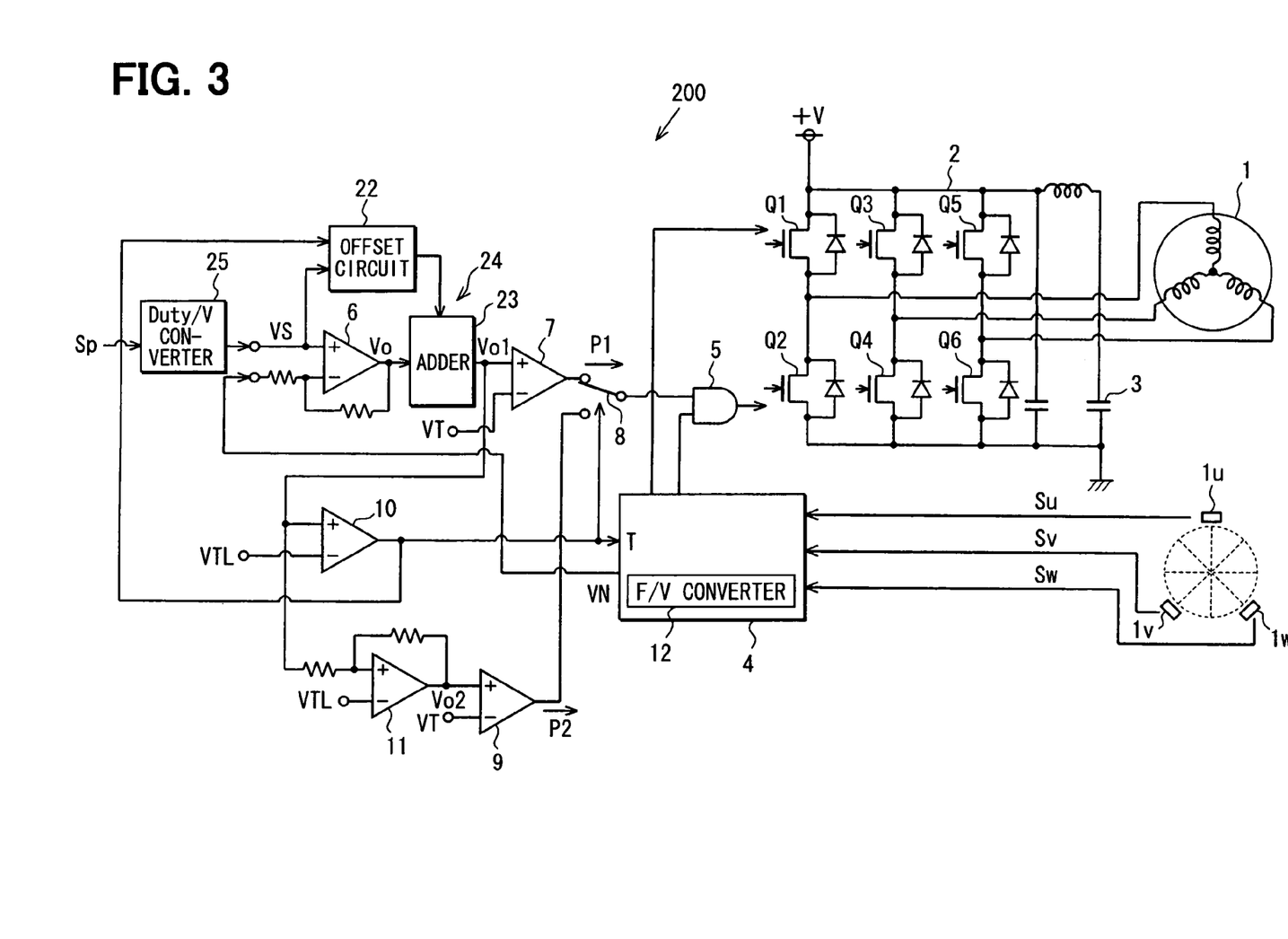
FIG. 3 is a block diagram of a motor controller according to a second embodiment of the present invention.

A motor controller 200 according to a second embodiment of the present invention is described below with reference to FIG. 3. Differences between the motor controller 200 shown in FIG. 3 and the motor controller 100 shown in FIG. 1 are as follows:

The motor controller 200 includes a duty-ratio to voltage (Duty/V) converter 25 replacing the F/V converter 21. The Duty/V converter 25 converts a PWM signal Sp, which acts as a command to control the motor 1, into a target voltage signal VS based on a duty ratio of the PWM signal Sp. The PWM signal Sp is fed from an ECU of the vehicle to the Duty/V converter 25. The motor controller 200 is used when the command to control the motor 1 is provided in a PWM signal form, not a frequency signal form. Like the F/V converter 21, the Duty/V converter 25 does not add an offset voltage to the target voltage signal VS. Therefore, the target voltage signal VS outputted from the Duty/V converter 25 changes lineally.

Third Embodiment

Figure 4:
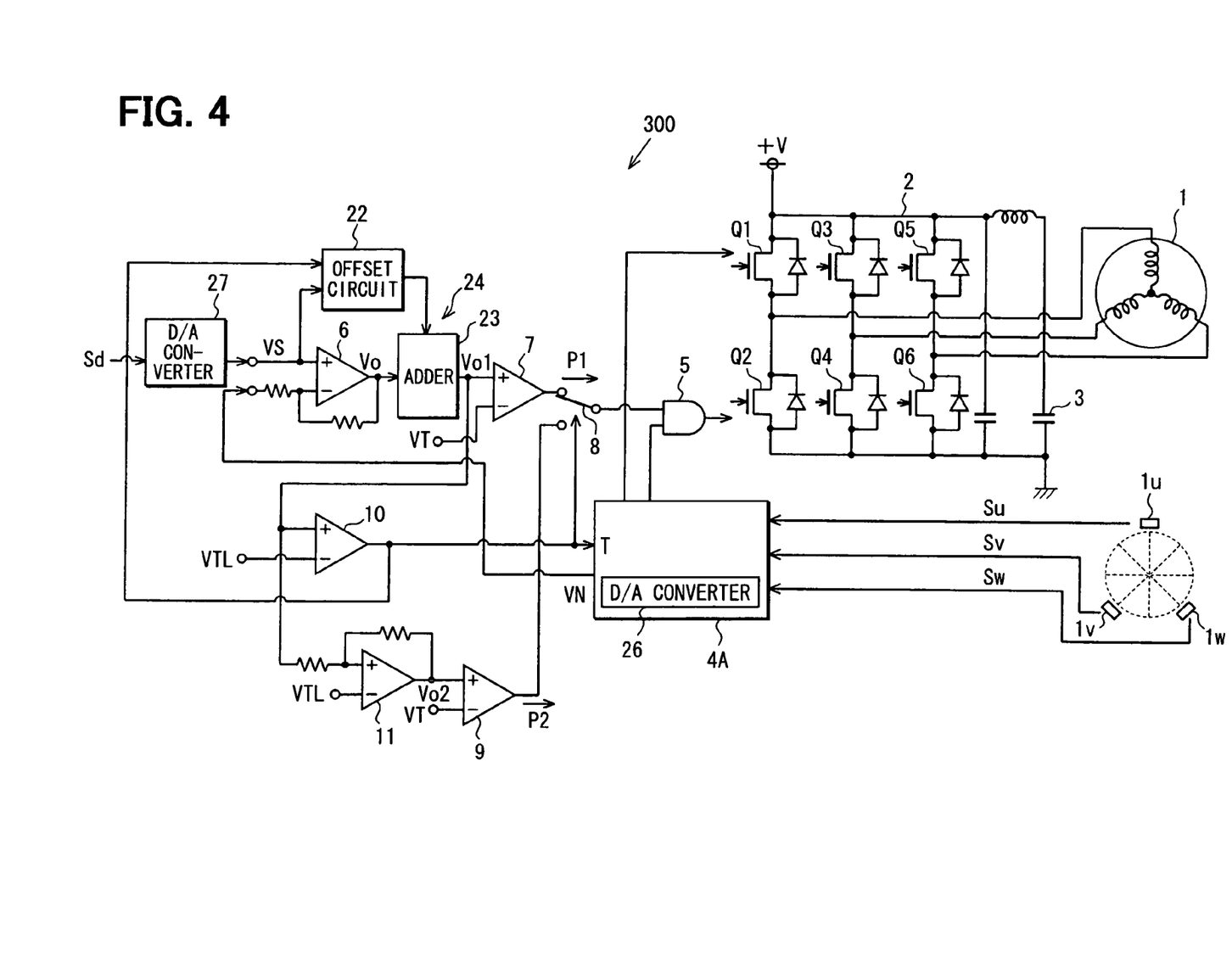
FIG. 4 is a block diagram of a motor controller according to a third embodiment of the present invention.

A motor controller 300 according to a third embodiment of the present invention is described below with reference to FIG. 4. Differences between the motor controller 300 shown in FIG. 4 and the motor controller 100 shown in FIG. 1 are as follows:

The motor controller 300 includes a control circuit 4A and a digital-to-analog (D/A) converter 27 replacing the control circuit 4 and the F/V converter 21, respectively. The control circuit 4A has a D/A converter 26 replacing the F/V converter 12.

The D/A converter 27 converts binary data Sd, which acts as a command to control the motor 1, into a target voltage signal VS. The binary data Sd is fed from the ECU of the vehicle. The motor controller 300 is used, when the command to control the motor 1 is provided in a binary data form, not a frequency signal form. Like the D/A converter 27, the D/A converter 27 does not add an offset voltage to the target voltage signal VS. Therefore, the target voltage signal VS outputted from the D/A converter 27 changes lineally.

A logic circuit (not shown) is provided upstream of the D/A converter 26 in the control circuit 4A. The logic circuit includes a counter circuit that counts the number of pulses of position detection signals Su, Sv, Sw. For example, the counter circuit counts the number of pulses based on an interval between adjacent rising edges or adjacent falling edges of the pulses. In this case, the counter circuit counts one cycle of the position detection signals Su, Sv, Sw. Alternatively, the counter circuit counts the number of pulses based on an interval between adjacent a rising edge and a falling edge of the pulses. In this case, the counter circuit counts a half cycle of the position detection signals Su, Sv, Sw. The D/A converter 26 converts a count value of the counter circuit into a rotation speed signal VN.

MODIFICATION

The embodiment described above may be modified in various ways. For example, the control circuit 4, the amplifier circuit 6, the first comparison circuit 7, the signal switch circuit 8, the second comparison circuit 9, the third comparison circuit 10, the amplifier circuit 11, the F/V converter 21, and the offset voltage addition circuit 24 may be constructed as a monolithic integrated circuit (IC).

Figure 5A:
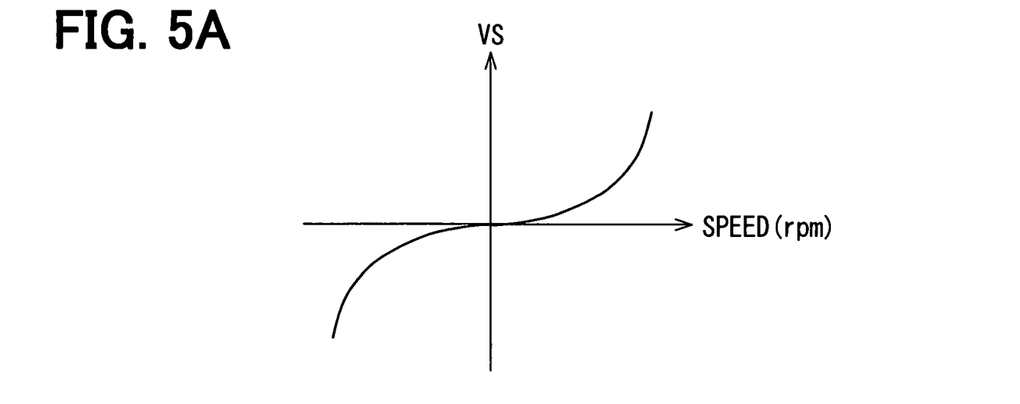
FIG. 5A is a graph showing an actual relationship between an actual rotation speed of a motor controlled by a motor controller according to a first modification of the present invention, and a target voltage signal in the motor controller according to the first modification.
Figure 5B:
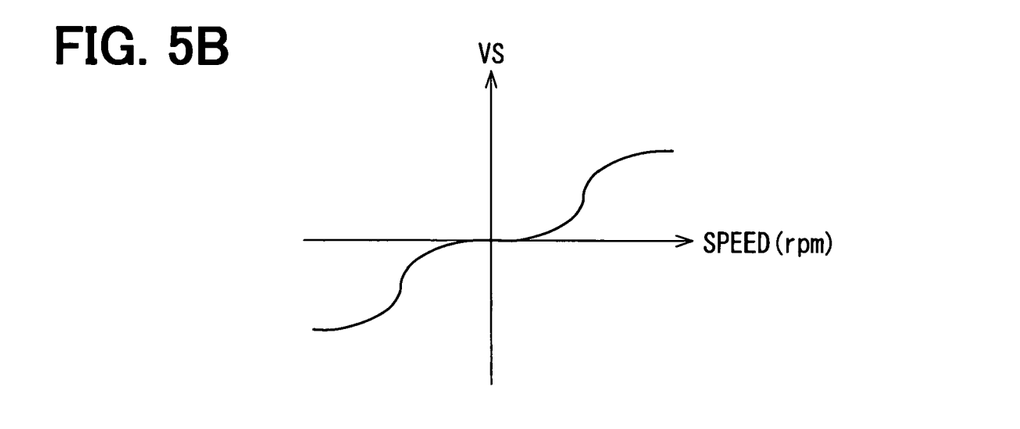
FIG. 5B is a graph showing an actual relationship between an actual rotation speed of a motor controlled by a motor controller according to a second modification of the present invention, and a target voltage signal in the motor controller according to the second modification.
Figure 5C:
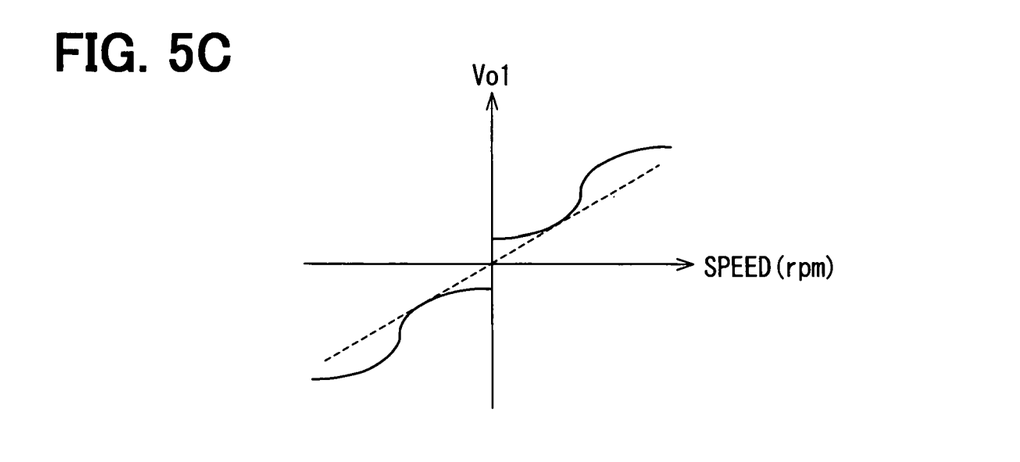
FIG. 5C is a graph showing a relationship between the actual rotation speed of the motor controlled by the motor controller according to the second modification and an addition voltage signal in the motor controller according to the second modification.

The target voltage signal VS outputted from the F/V converter 21, the Duty/V converter 25, or the D/A converter 27 may change nonlinearly. For example, as shown in FIG. 5A, the target voltage signal VS may change in a quadratic curve. Alternatively, the target voltage signal VS may change in a curve shown in FIG. 5B. In this case, the addition voltage signal Vo1 with the offset voltage changes as shown in FIG. 5C.

The voltage level of the offset voltage may vary with the rotation speed of the motor 1. The voltage and signal levels described in the embodiments may vary according to needs. The motor 1 can be used as a power source for various kinds of load devices, in particular, in vehicles.

Such changes and modifications are to be understood as being within the scope of the present invention as defined by the appended claims.

What is claimed is:

1. A motor controller for controlling a motor comprising:
   an inverter circuit that drives the motor based on a PWM signal, the PWM signal including a first PWM and a second PWM signal;
   a control circuit that controls timing of supply of the PWM signal to the inverter circuit;
   a rotation speed detection circuit that generates an actual rotation speed signal having a first voltage corresponding to an actual rotation speed of the motor;
   an amplifier circuit that outputs a differential voltage signal by amplifying a difference between the actual rotation speed signal and a target rotation speed signal having a second voltage that causes the motor to rotate at a target rotation speed;
   a first comparison circuit that generates the first PWM signal by comparing the differential voltage signal with a carrier signal having a predetermined frequency, the carrier signal changing between an upper limit voltage and a lower limit voltage;
   a voltage detection circuit that outputs a switch signal for reversing a rotation direction of the motor, the switch signal having a first signal level to command the motor to rotate in forward direction when a voltage of the differential voltage signal is equal to or greater than the lower limit voltage of the carrier signal, the switch signal having a second signal level to command the motor to rotate in reverse direction when the voltage of the differential voltage signal is less than the lower limit voltage of the carrier signal, a signal generation circuit that outputs a correction voltage signal during a period of time when the voltage of the differential voltage signal is less than the lower limit voltage of the carrier signal, the correction voltage signal having a voltage greater than the lower limit voltage of the carrier signal;

a second comparison circuit that generates the second PWM signal by comparing the correction voltage signal with the carrier signal;

a switch circuit that supplies the first PWM signal to the control circuit when the switch signal has the first signal level, the switch circuit supplying the second PWM signal to the control circuit when the switch signal has the second signal level; and an offset voltage addition circuit that adds an offset voltage to the differential voltage signal according to the signal level of the switch signal, wherein when the switch signal has the second signal level, the control circuit controls the inverter circuit in such a manner that the motor receives reverse torque.

2. The motor controller according to claim 1, wherein the motor is used as a power source for a load device in a vehicle.

* * * * *